Nov. 27, 1951 W. POWELL 2,576,477
FERRIS WHEEL
Filed May 8, 1948 7 Sheets-Sheet 1

Inventor
Wilton Powell

By
A. Schapp
ATTORNEY.

Nov. 27, 1951          W. POWELL          2,576,477

FERRIS WHEEL

Filed May 8, 1948          7 Sheets-Sheet 2

Inventor
Wilton Powell

By    A. Schapp
ATTORNEY.

Nov. 27, 1951  W. POWELL  2,576,477
FERRIS WHEEL

Filed May 8, 1948  7 Sheets-Sheet 3

Inventor
Wilton Powell

By
A. Schapp
ATTORNEY.

Nov. 27, 1951     W. POWELL     2,576,477
FERRIS WHEEL

Filed May 8, 1948     7 Sheets-Sheet 4

Inventor
Wilton Powell

By

A. Schapp
ATTORNEY.

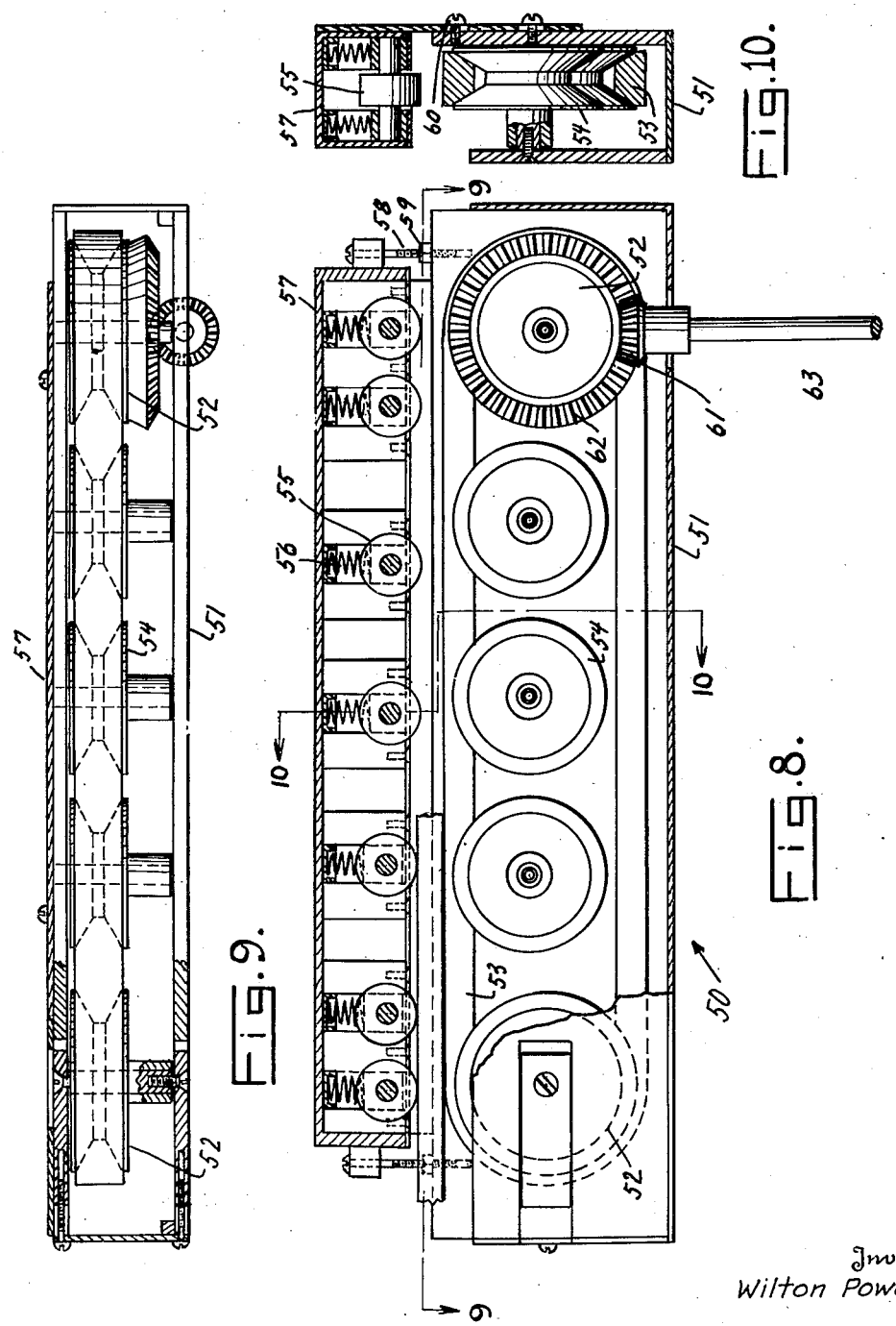

Nov. 27, 1951 W. POWELL 2,576,477
FERRIS WHEEL
Filed May 8, 1948 7 Sheets-Sheet 7

Inventor
Wilton Powell

By
A. Schapp.
ATTORNEY.

Patented Nov. 27, 1951

2,576,477

UNITED STATES PATENT OFFICE 2,576,477

FERRIS WHEEL

Wilton Powell, Houston, Tex.

Application May 8, 1948, Serial No. 25,820

7 Claims. (Cl. 104—76)

The present invention relates to improvements in an amusement device generally known as a Ferris wheel comprising a giant, power driven, vertical wheel bearing swinging cars or chairs for passengers, and the principal object of the invention is to provide a Ferris wheel constructed in such a manner as to produce a great variety of compound movements with surprising and breath-taking rocking and fly-wheel effects.

In carrying out this general idea of the invention it is proposed to provide a Ferris wheel the shape of which is substantially eliptical, but at the same time departs from the shape of a true ellipse to produce a certain irregularity in the path of a car travelling along the rim of the wheel.

It is further proposed to provide novel drive means for revolving the wheel, with suitable brake mechanism whereby the wheel may be stopped in any desired position, with its long axis disposed horizontally or vertically or at any angle between said two positions.

It is further proposed to provide means whereby the cars may be moved along the rim of the wheel in either direction to provide compound effects.

It is a further object of the invention to provide novel operating mechanism for causing the cars to travel along the rim of the wheel.

It is further contemplated, in the present invention, to arrange the operating mechanism for the cars as a part of the wheel so as to be carried thereby and to revolve therewith.

And finally, it is proposed to provide a brake mechanism for the cars having operating means arranged outside the wheel and being operable to prevent relative movement between the cars and the wheel.

Further objects and advantages of my invention will appear as the specification proceeds, and the novel features of my invention will be fully defined in the claims attached hereto.

Figure 1:
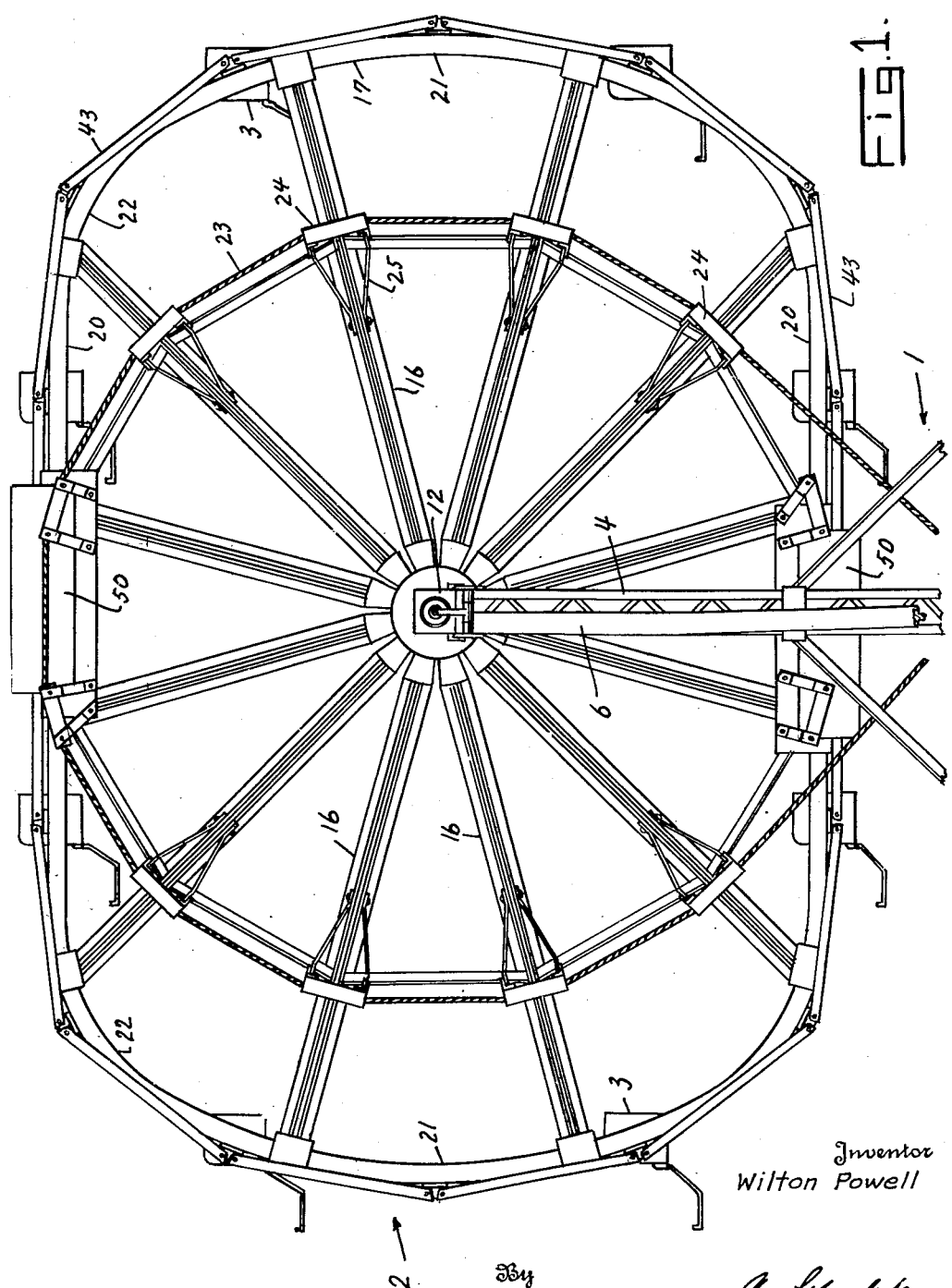
Figures 2, 3:
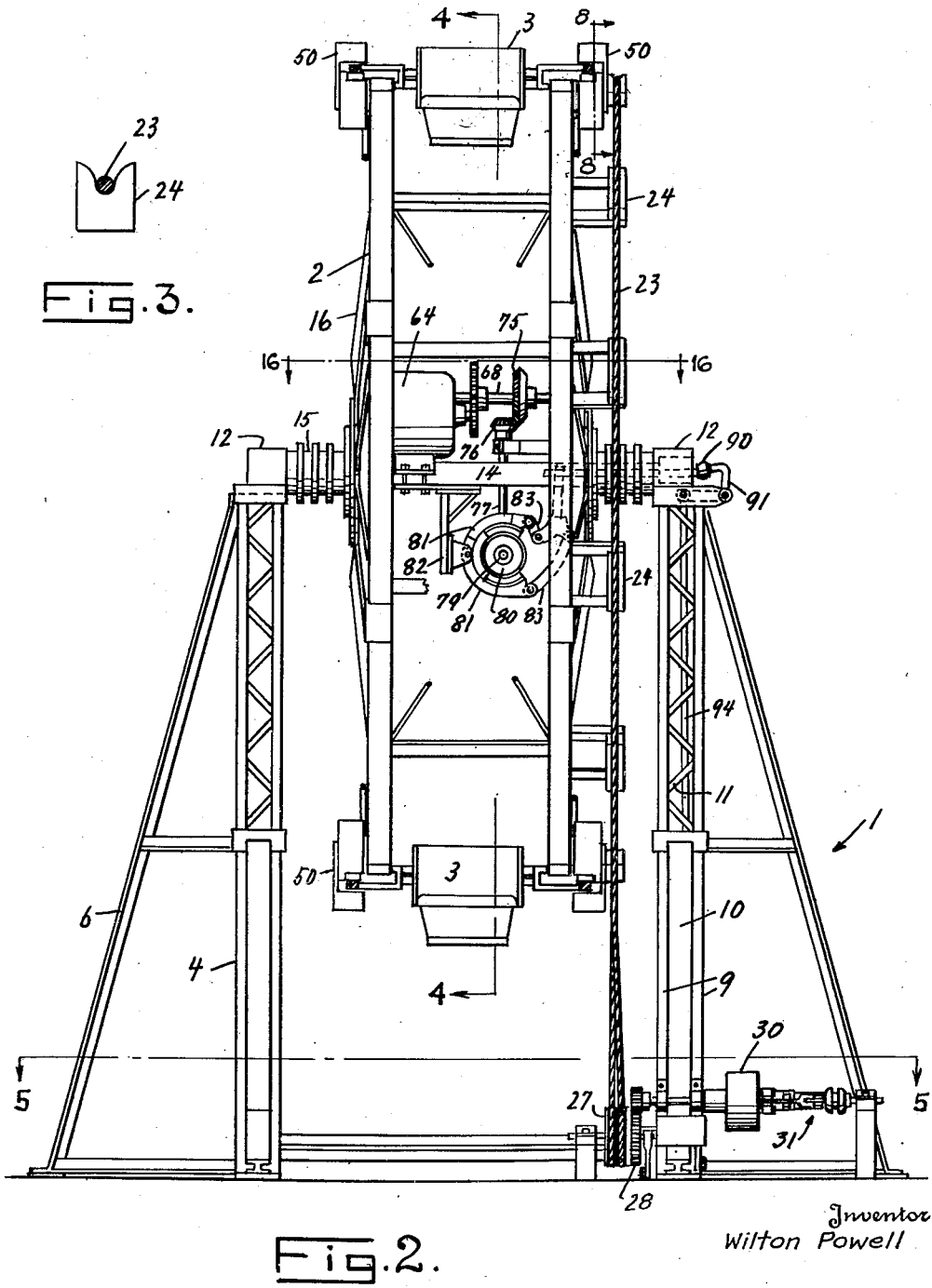
Figure 4:
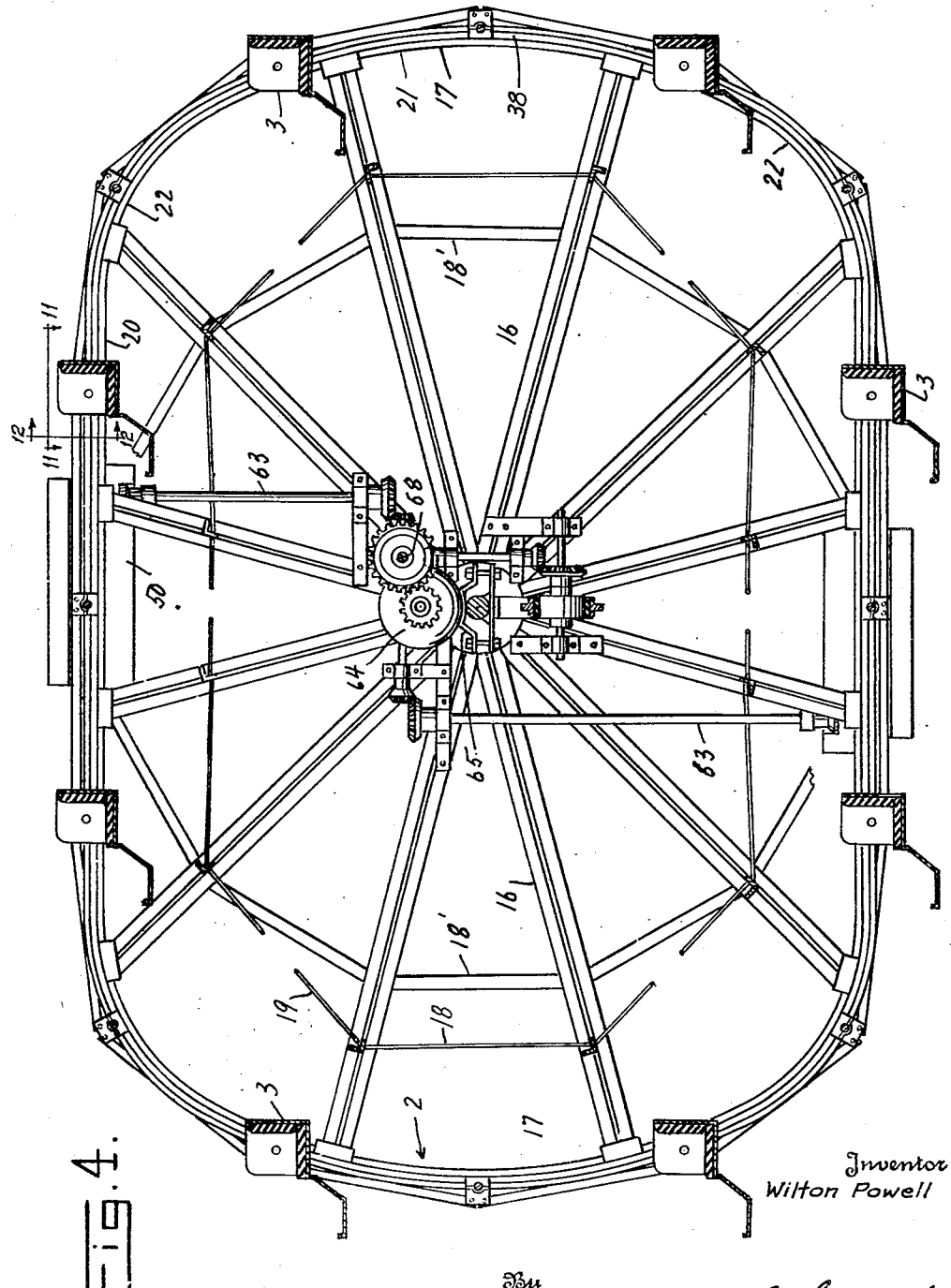
Figure 5:
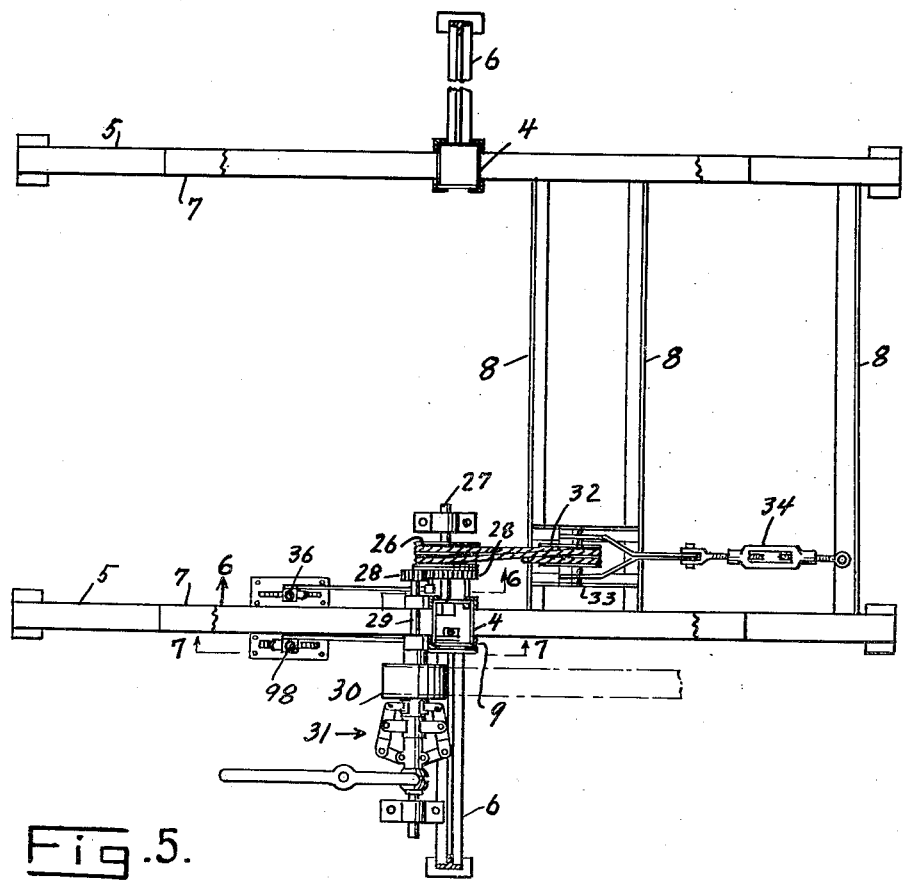
Figures 6, 7:
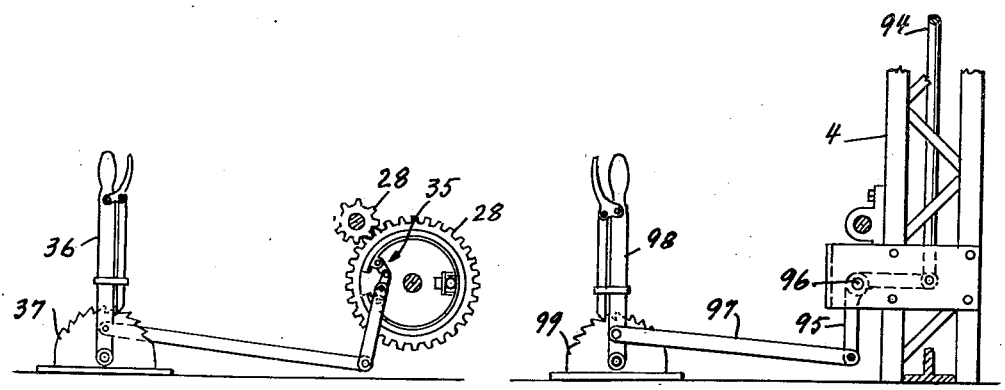
Figure 11:
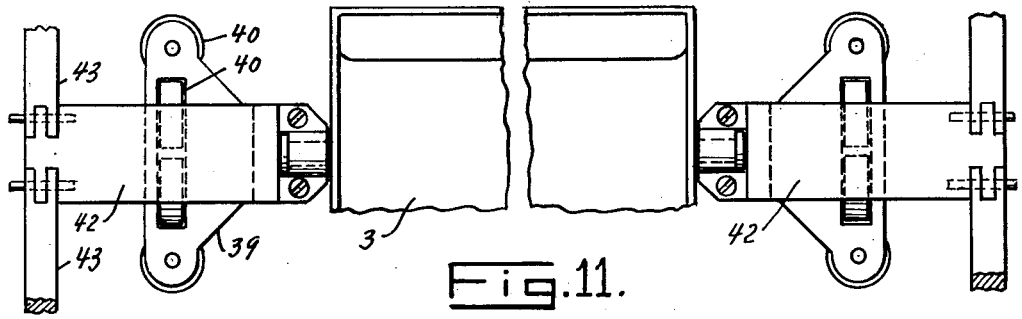
Figure 12:
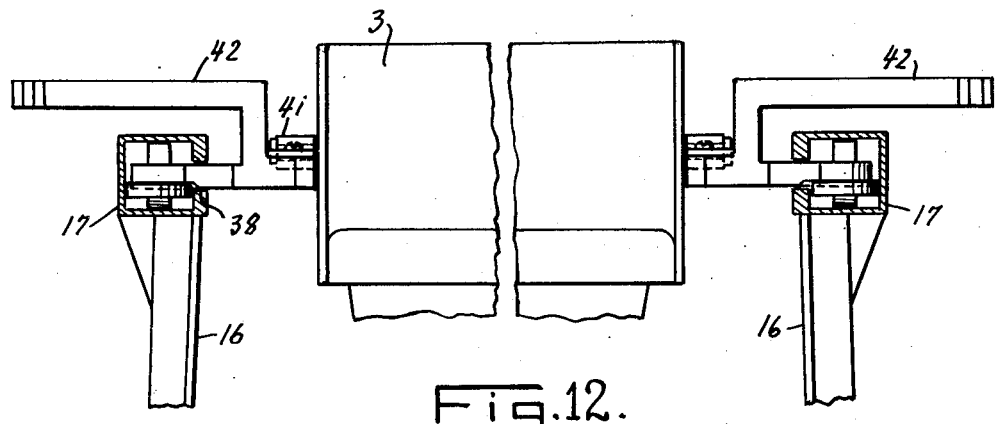
Figure 13:
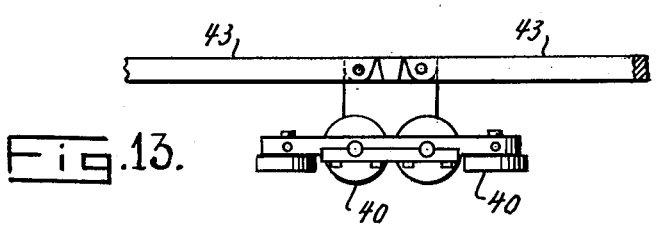
Figure 14:
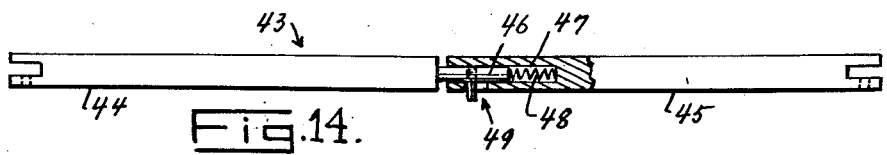
Figure 15:
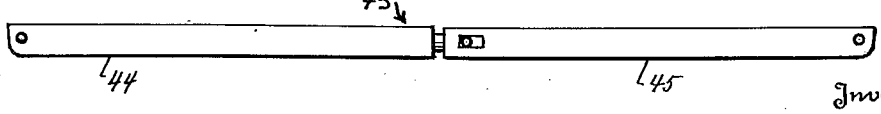
Figure 16:
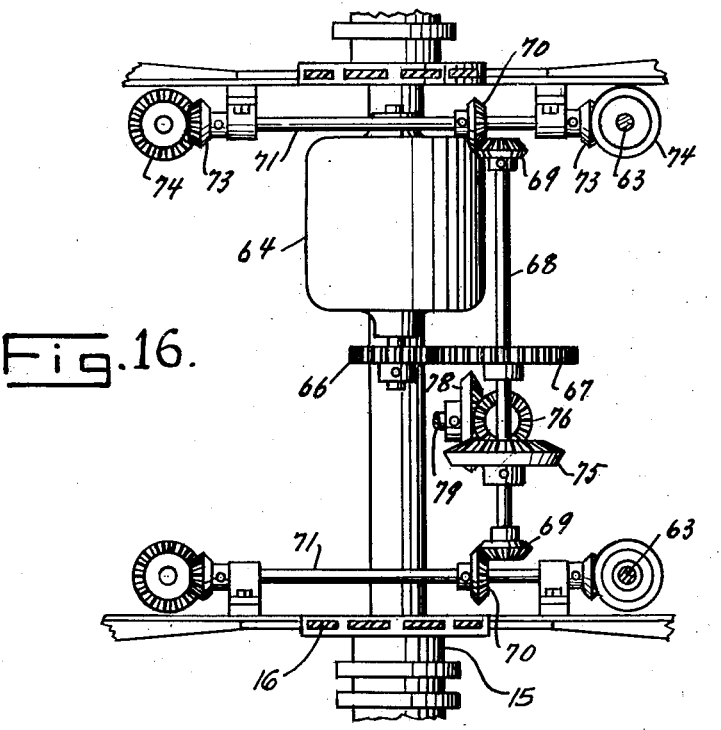
Figure 17:
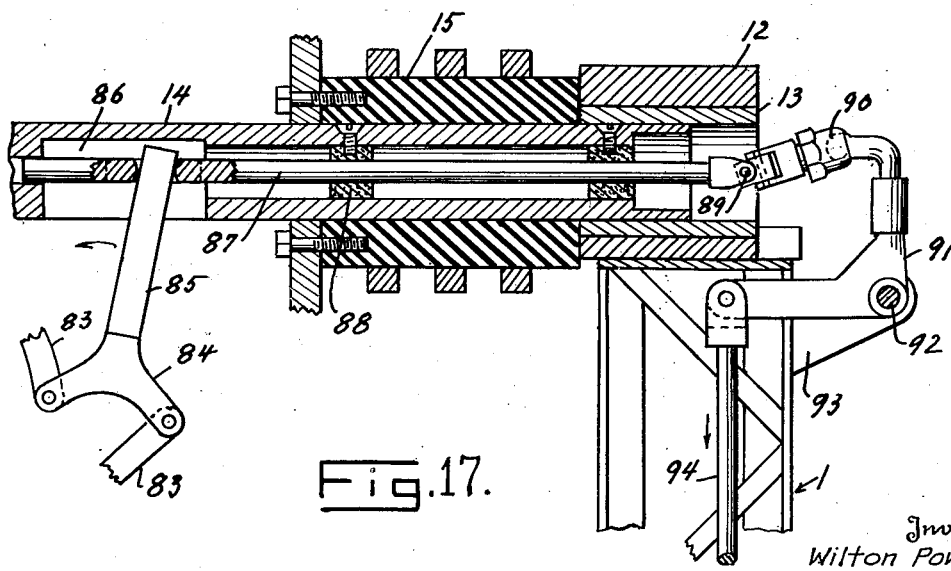

The preferred form of my invention is illustrated in the accompanying drawing, in which Figure 1 shows a side view of my Ferris wheel, with the lower portion omitted, Figure 2, an end view of the Ferris wheel, Figure 3, a detail view of a cable-guiding block used in my invention, Figure 4, a section taken along line 4—4 of Figure 2, Figure 5, a horizontal section taken along line 5—5 of Figure 2, Figure 6, a vertical section taken along line 6—6 of Figure 5, Figure 7, a vertical section taken along line 7—7 of Figure 5, Figure 8, an enlarged sectional detail view taken along line 8—8 of Figure 2, Figure 9, a detail view taken along line 9—9 of Figure 8, certain portions being shown in section, Figure 10, a section taken along line 10—10 of Figure 8, Figure 11, a plan view, on an enlarged scale, of a car and its supporting mechanism, as seen from line 11—11 of Figure 4, a portion of the car being broken away, Figure 12, a front view of the same car with its supporting mechanism as seen from line 12—12 of Figure 4, the supporting channels being shown in section, Figure 13, an end view of the chair supporting mechanism, substantially as seen from the left side of Figure 11, Figure 14, a detail plan view, partly in section, of a chain link used in my invention for interconnecting the cars, Figure 15, a side view of the same link, Figure 16, a sectional detail view on an enlarged scale of a drive mechanism for the chairs, substantially as seen from line 16—16 of Figure 2, and Figure 17, a central section, on an enlarged scale, through a portion of the wheel supporting shaft with attendant parts illustrating a portion of a brake mechanism used in my device.

While I have shown only the preferred form of my invention, I wish to have it understood that various changes and modifications may be made within the scope of the claims attached hereto without departing from the spirit of the invention.

Referring to the drawings in detail, my invention comprises in its principal features a frame 1, a wheel 2 revolvably supported therein, means for revolving the wheel, brake means, cars 3 swingably supported in the rim of the wheel, and means for revolving the cars around the wheel, including a brake mechanism. The cars may be of any suitable form to carry one or more passengers, and are here shown as chairs equipped with backs, sides and foot-rests in the manner shown.

The frame 1 may be of any suitable construction and is here shown as comprising a pair of posts 4 supported on a pair of spaced base members 5 and suitably held against outward sway by braces 6 and against side sway by braces 7. The base members 5 may be held in spaced and parallel relation by means of spacing members 8. Each post is made up of four angle irons 9, and in the lower portions the angle irons are joined by means of plates 10 while in the upper portions they are interconnected by diagonal braces 11. The upper ends of the posts have bearings 12 mounted thereon in alined relation, and these bearings carry, in bushings 13, the main shaft 14 extending horizontally across the frame.

The wheel 2 is mounted on the shaft and comprises two spaced sections, each of which consists of a hub 15, a series of spokes 16 and a rim 17, the spokes of each section being interconnected by means of braces 18 and 18', and the spokes of the two opposing sections being interconnected by cross-braces 19.

The two rims are substantially identical in form and may be roughly described as elliptical in form instead of being circular. They depart somewhat from elliptical shape in so far as each rim includes, in the position shown in Figures 1 and 4, two straight horizontal sections 20 of considerable length, two circular end sections 21 having the axis of rotation for their center, and four relatively short corner sections 22 interconnecting the straight sections and the circular sections on relatively short arcs. It will be noted that these corner sections make for a certain irregularity in travel. A chair, for instance, descending at the left-hand upper corner in Figure 1, would rather abruptly change from a slight grade to a very steep grade. The spacing between the horizontal sections 20 is much less than the diameter of the two circular sections 21 so as to produce a generally elliptical effect.

The wheel is operated for rotary motion by means of an endless cable 23 which is trained over a series of circumferentially arranged, grooved blocks 24, supported on one side of the wheel by means of brackets 25 projecting from the spokes of one of the wheel sections. This cable is also trained over a drive pulley 26 mounted on a shaft 27 which latter is driven, through gears 28, from a shaft 29 having the drive pulley 30 thereon. The latter may be rotated by any suitable source of power, a suitable clutch mechanism being provided for this drive as at 31. A portion of the cable is also guided over an idler pulley 32 slidably mounted on tracks 33 and adapted to be operated, for tensioning the cable, by means of a turn-buckle 34.

A suitable conventional brake mechanism 35 is associated with one of the gears 28, as shown in Figure 6, and may be set by means of a handle 36 cooperating with a ratchet 37.

Thus the wheel may be rotated by operation of the cable and may be stopped in any selected position, with the long axis in horizontal position (as shown) or in vertical position, or at any desired angle.

The rims 17 of the wheel are made in the form of channels (see Fig. 12), with slots or openings 38 facing each other. Each chair 3 is supported in a carriage comprising two opposing plates 39 projecting through the slots and having horizontal and vertical rollers 40 riding against the channel walls, the chair forming part of the carriage and being swingably supported in bearings 41. Each of the plates 39 has a bracket 42 projecting beyond the channel, and the brackets of successive carriages are interconnected by links 43, so that all the carriages and links form a complete chain adapted to travel about the rim of the wheel.

While in the assembly views the links are shown as simple connecting rods, they should have a slight degree of extensibility, due to the irregular shape of the rims, and are preferably constructed as shown in Figures 14 and 15, each link consisting of two sections 44 and 45. One of the sections has a pin 46 slidable in a socket 47 in the other section, with a spring 48 urging the link sections apart, while an additional pin and slot arrangement 49 limits relative movement between the sections.

The chain of links and carriages is moved along the rim of the wheel by means of the drives 50, two of which are shown in connection with each rim section. The drives are secured upon the outside of the rim sections so as to rotate therewith and are preferably located midway of the straight portions of the rim sections as shown. One of these drives is illustrated in detail in Figures 8, 9 and 10.

Each drive comprises a channel-shaped housing 51 secured upon the rim section, with two main pulleys 52 mounted in the housing in spaced relation, the two pulleys being suitably grooved to receive a V-belt 53 thereon. The length of the upper stretch of the V-belt, as seen in Figure 8, is substantially co-extensive with the length of one of the links, and the belt is disposed to allow the links to successively travel over the upper stretch of the belt. Additional idler rollers 54 are mounted in the housing between the main pulleys to give support to the upper stretch of the V-belt. Suitable adjustment is provided, for the left-hand pulley, as shown in Figure 9 to insure proper gripping action between the links and the V-belt.

The links are urged into gripping contact with the V-belt by a series of tension rollers 55, acted on by springs 56 to bear on the upper link surfaces. The rollers are mounted in an inverted channel-shaped housing 57 secured upon the housing 51 with freedom of vertical adjustability, by means of screws 58 operating in nuts 59, and also by means of screws 60 operating in slots as shown in Figure 10.

Each of the drives is actuated by a pinion 61 meshing with a gear 62 provided on one of the pulleys 52, the pinion being mounted on a shaft 63.

The operating mechanism for the shafts 63, of which four are provided for the four link drives, may be best understood by reference to the assembly views of Figures 2 and 4 and the detail view of Figure 16.

A motor 64 is mounted inside the wheel above the main shaft 14 on a bracket 65 secured upon one of the wheel sections. The motor drives, through gears 66—67, a shaft 68 running parallel to the main shaft. The shaft 68 drives, through two sets of bevel gears 69—70, two shafts 71 running alongside the wheel sections, and these shafts again drive, through bevel gears 73—74, the four shafts 63 carrying the pinions 61.

This operating mechanism for the link drives again has a brake mechanism associated therewith operative on the shaft 68. The brake mechanism may be best understood by reference to Figures 2, 7, 16 and 17.

The shaft 68 has a bevel gear 75 mounted thereon which meshes with a pinion 76 on a shaft 77, which latter drives, through a bevel gear 78, a brake shaft 79 having a brake wheel 80 mounted thereon. Two brake shoes 81 are pivoted in a bracket 82 fixed with respect to the wheel and are operable for tightening upon the brake wheel by means of two links 83 and an operating member 84 having a stem 85 extending into a slot 86 in the main shaft 14.

This stem is operable for tightening the brake shoes by means of a rod 87 slidable axially in the main shaft 14. This rod is supported in bearings 88 and is connected, at its outer end, and through two universal joints 89 and 90, to a bell crank lever 91 pivoted, as at 92, in a bracket 93 fixed to one of the main supporting posts 1 of the wheel (see Fig. 17). One end of the bell crank lever extends into the supporting post and is attached to a vertical rod 94 projecting downwardly through the post. The lower end of this rod (see Fig. 7) is connected to a second bell crank lever 95 pivoted in a fixed bracket, as at 96, and the free arm of this lever is operated by means of a link 97 and a conventional brake lever 98 cooperating with a ratchet 99.

A suitable landing platform (not shown) should be arranged underneath the main wheel to facilitate mounting and demounting operations for passengers, and this platform should be adjustable for raising and lowering to compensate for different positions of the wheel.

In operation, the wheel and the chain of chairs or cars may be run individually or both at the same time to produce many different riding effects and sensations. When either of the agencies is run alone, the other may be firmly locked against motion by the brake mechanisms described.

When it is desired to run the wheel alone, the operator shuts off the motor 64, which is preferably made reversible, and operates the brake lever 98 so as to tighten the brake shoes 81 upon the brake 80 which locks the shaft 68 and the operating mechanism for the chain drive. This causes the cars or chairs to revolve with the Ferris wheel, each car describing a circular path on a radius depending upon the position of the car on the wheel.

If it is desired to run the chain alone, the operator may first move the wheel to any desired position, with its long axis vertical or horizontal or at any intermediate angularity. This gives endless opportunities for varying the car travel and the sensations experienced by the passengers.

He then operates the brake lever 36 to set the brake 35 which locks the wheel against rotation, and starts the motor 64, which preferably should be of the reversible type and should have various speeds. This sets in motion the drives 50 for the chains of cars or chairs, and the latter move along the rim channels of the wheel in an endless variety of different motions, depending upon the position of the wheel. It should be particularly noted that the irregular shape of the channels, with its abrupt corner sections, brings into action various forces, centrifugal, centripetal and inertia, which will give the passengers many unexpected and exciting thrills.

And finally, the operator may use both drives at the same time, with a great variety of resulting compound movements. He may change the speed of the chain, he may drive the latter forward to add to the speed of the wheel or backward to subtract from the speed of the wheel. He may drive the chain backward at the same speed that the wheel goes forward in which case the cars hold their respective positions except as they are moved by the irregular curve of the wheel. And he may drive the chain backward at a speed in excess of the wheel speed in which case the car occupants see the wheel rim speed ahead of them and are still subject to the rocking movements incident to the irregular shape of the wheel rim.

I claim:

1. In a Ferris wheel of the character described, a frame, a shaft horizontally supported therein, a wheel supported on the shaft and having a pair of spaced rim sections, cars swingably supported between the rim sections, means carried by the wheel for moving the cars along the rim sections, a brake for said means carried by the wheel, and means mounted outside the wheel for operating the brake.

2. In a Ferris wheel of the character described, a frame, a shaft horizontally supported therein, a wheel supported on the shaft and having a pair of spaced rim sections, cars swingably supported between the rim sections, means carried by the wheel for moving the cars along the rim sections, a brake for said means carried by the wheel, and independently mounted operating means for the brake, the latter means including an operating member slidable axially within the shaft.

3. In a Ferris wheel of the character described, a frame, a shaft horizontally supported therein, a wheel supported on the shaft and having a pair of spaced channel-shaped rim sections opening toward one another, a pair of transverse members supported in the rim sections in alined relation, a car swingably supported between the transverse members, endless chains guided about the wheel and having the transverse members secured thereto, and means for advancing the chains for moving the car about the wheel in endless movement.

4. In a Ferris wheel of the character described, a frame, a shaft horizontally supported therein, a wheel supported on the shaft and having a pair of spaced channel-shaped rim sections opening toward one another, a pair of transverse members supported in the rim sections in alined relation, a car swingably supported between the transverse members, and means for advancing the transverse members along the rim sections in endless movement including a series of additional pairs of car-supporting transverse members carried by the rim sections, links connecting the transverse members along the rim sections to form continuous chains therewith, and means carried by the wheel and operative on the links for advancing the same.

5. In a Ferris wheel of the character described, a shaft, a wheel revolvable thereon and having a pair of spaced rims, a carriage-carrying chain movable on the wheel rims, means carried by the wheel for driving the chain, a brake for the driving means, an operating member for the brake slidable in the shaft, and means mounted outside the wheel for actuating the operating member.

6. In a Ferris wheel of the character described, a revolvably mounted wheel having two opposing rim sections, a plurality of carriages movably supported in the rim sections, brackets mounted on the carriages and projecting beyond the rim sections, and links connecting the outer ends of the brackets so as to form an endless chain about the rim sections, the wheel having means mounted thereon and rotatable therewith for driving the links.

7. In a Ferris wheel of the character described, a revolvably mounted wheel having two opposing rim sections, a plurality of carriages movably supported in the rim sections, brackets mounted on the carriages and projecting beyond the rim sections, and links connecting the outer ends of the brackets so as to form an endless chain about the rim sections, the wheel having means mounted thereon and rotatable therewith for driving the links, a brake for the driving means, and means mounted outside the wheel for operating the brake.

WILTON POWELL.

REFERENCES CITED

The following references are of record in the file of this patent:

UNITED STATES PATENTS

| Number | Name | Date |
|---|---|---|
| 722,502 | Edison | Mar. 10, 1903 |
| 881,095 | Chubbuck | Mar. 3, 1908 |
| 1,153,274 | Tanner | Sept. 14, 1915 |
| 1,539,094 | Miller | May 26, 1925 |
| 1,564,952 | Fisher | Dec. 8, 1925 |
| 1,568,424 | Smith | Jan. 5, 1926 |
| 1,737,032 | Seller | Nov. 26, 1929 |
| 1,773,636 | Spillman | Aug. 19, 1930 |
| 1,889,112 | Shoemaker | Nov. 29, 1932 |
| 2,048,215 | Miller | July 21, 1936 |